United States Patent Office 2,854,417
Patented Sept. 30, 1958

2,854,417

FATTY ACID AMIDE DEFOAMANT

Roy T. Edwards, Roslyn, and Ernst P. Rittershausen, Hempstead, N. Y., assignors to Socony Mobil Oil Company, Inc., a corporation of New York No Drawing. Application December 13, 1955
Serial No. 552,695

5 Claims. (Cl. 252—358)

The present invention relates to the suppression or inhibition of the formation of foam. It is more particularly concerned with materials that suppress the formation of foam in aqueous media, such as those of sewage disposal plants.

In the operation of steam boilers it has been customary to treat the water with basic materials in order to prevent the formation of corrosion. Such treatment, however, renders the feed water decidedly alkaline and frequently imparts to it tendencies to form excessive amounts of foam. In sewage disposal plants, on the other hand, the aqueous media are decidedly acidic or at least substantially neutral. In other words, the pH of the aqueous media in such plants is never greater than about 7, whereas, on the other hand, the pH of boiler feed waters is decidedly greater than 7. Yet, quite often the aqueous media having a pH lower than 7 will have a tendency to foam. This is particularly noticeable in modern sewage disposal plants because of the increased use of household detergents. In such cases, the acidic sewage disposal liquors have a marked tendency to produce large amounts of foam. It will be recognized that such foaming impairs the efficient operation of the disposal plants. It will be appreciated, therefore, that it is highly desirable to provide a means of inhibiting or suppressing the formation of foam in operations that involve the use of aqueous media having a pH less than 7, such as in sewage disposal plants.

In the treatment of boiler feed waters, there have been proposed many methods for suppressing the formation of foam in the boiler tubes. On the other hand, the treatment of acidic aqueous media, such as encountered in sewage disposal plants, is a relatively new problem. Insofar as is now known, no methods of treatment have been advanced for suppressing the formation of foam in aqueous media having a pH lower than about 7.

It has now been found that the formation of foam in aqueous media having a pH less than 7 can be suppressed simply and economically. It has been discovered that such foaming can be suppressed by adding to the aqueous media small amounts of a defoamant comprising a fatty acid amide, a nonionic surface active agent, and a carrier therefor.

Accordingly, it is an object of this invention to provide a defoamant for the suppression of foam in aqueous media having a pH less than 7. Another object is to provide a means for suppressing the formation of foam in modern sewage disposal plants. A specific object is to provide a defoamant for suppressing the formation of foam in aqueous media having a pH less than 7, that comprises a fatty acid amide, a nonionic surface active agent, and a carrier therefor. Other objects and advantages of this invention will become apparent to those skilled in the art from the following detailed description.

In general, the present invention provides a composition for suppressing foam in aqueous media having a pH not greater than 7, which comprises critical amounts of a fatty acid amide having between 12 and 20 carbon atoms, and of a nonionic surface active agent, and a carrier therefor.

The amides contemplated herein are the simple fatty acid amides having the formula, $RCONH_2$, wherein R is an acylic hydrocarbon group having between 11 and 19 carbon atoms. Nonlimiting examples are dodecanamide, tetradecanamide, hexadecanamide, octadecanamide, octadecenamide and octadecadienamide. The amides can be relatively pure compounds or of commercial grade. They can be mixtures containing substantial amounts of two or more amides. Ordinarily, in mixtures containing amides, one amide is in the predominant concentration.

The surface active agents utilizable in the compositions of this invention are of the nonionic type, i. e., they are not dependent upon ionization for their surface active properties. Many such materials are well known to those skilled in the art. Preferred surface active agents are the polyoxyethylene ethers of octylphenol that have the following general structural formula:

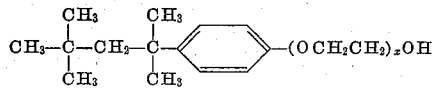

wherein $x$ is an integer varying between about 5 and about 13. Another type is the mono fatty acid ester of polyethylene glycol having the general formula:

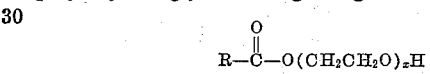

wherein R is an aliphatic radical having between about 11 and about 17 carbon atoms and $x$ is an integer varying between about 5 and about 50. Preferably R will be 17 and $x$ will be 10. Still another class of surface active agent utilizable herein are the fatty acid esters of sorbitan, such as sorbitan mono-oleate.

The carrier utilizable in the composition of the present invention is a material in which the fatty amide is soluble but which is substantially immiscible with water. A generally preferred carrier is a mineral oil of lubricating viscosity, preferably a mineral oil fraction having a Saybolt Universal viscosity of between about 30 and about 200 at 100° F. Other materials can be used that in themselves are not good defoamants, such as a mixture of alcohols, propylene glycol, alkylene glycol, ketones, esters, Butyl-Cellosolve and Butyl Carbitol, and the like.

Another component that can be used in the defoamant composition of this invention is a haze eliminator. In general, the materials utilizable as such are the fatty acids. Oleic acid is generally preferred, although other acids, such as caprylic and linoleic acids are contemplated. It must be understood, however, that the primary function of the haze eliminator is to induce greater customer appeal. Accordingly, the haze eliminator can be omitted where this is not a consideration.

As has been mentioned hereinbefore, the amounts of fatty acid amide and of nonionic surface active agent used in the defoamant of this invention are critical in relation to each other. The amount of fatty acid amide will vary between about 2 weight percent and about 50 weight percent. The amount of nonionic surface active agent must be between about 0.1 weight percent and about 0.5 weight percent. It has been found that if the nonionic surface active agent is used in greater concentrations than 0.5 weight percent, emulsion difficulties occur which interfere with the defoamant action. On the other hand, some surface active agent must be present in order to achieve good defoamant action. It is important, however, that the ratio of the amount of surface active agent to the fatty acid amide must be between about 0.01 and about 0.05.

The haze eliminator, if used, can be present in an amount varying between about 1 weight percent and about 50 weight percent. The balance of the formulation will be the carrier, such as mineral oil.

The following specific examples are for the purpose of illustrating the defoamant compositions of this invention and of exemplifying the specific nature thereof. It is to be strictly understood, however, that this invention is not to be limited by the particular additives or to the operations and manipulations described therein. Other materials, as discussed hereinbefore, are utilizable, as those skilled in the art will readily appreciate.

For the determination of the effectiveness of defoamant formulations used in aqueous environments having a pH less than 7, such as those of sewage plants, the following testing method has been found to be correlative with commercial scale operations. Twenty milliliters of an aqueous solution containing about 0.05 weight percent of a foam-producing agent, such as Nacconol NR are placed in a 100 milliliter graduated stoppered cylinder. One drop (approximately 0.05 milliliter) of the defoamant is added. The cylinder is then stoppered and shaken at the rate of one shake per second for a one minute period. Immediately after the shaking is stopped, the initial reading is taken. This reading is the total volume of liquid plus foam that is present in this cylinder. Subsequent readings are then taken at intervals of 10, 20, 30 and 60 seconds after the shaking operation has been stopped. Any defoamant that produces less than about 40 milliliters total volume of liquid and foam in this test is a satisfactory defoamant for use in acidic environments, such as those of sewage disposal plants.

EXAMPLE 1

A defoamant composition was prepared that contained 5 weight percent of a normal primary amide having the formula $RCONH_2$ wherein R was a mixture of $C_{16}$–$C_{18}$ alkyl groups, 5 weight percent oleic acid, 0.25 weight percent of a polyoxyethylene ether of octyl phenol having the following formula:

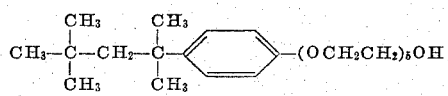

and 89.75 weight percent of a mineral oil having a Saybolt Universal viscosity of 100 seconds at 100° F. This material was subjected to the defoamant test. Pertinent data are set forth in Table I.

EXAMPLE 2

Another defoamant formulation was prepared that was the same as that described in Example 1 with the exception that the mineral oil was replaced with mineral spirits. The other concentrations of materials remain the same. This formulation also was subjected to the defoamant test and pertinent data are set forth in Table I.

*Table I*

| Time (seconds) | Total Volume Foam+ Liquid, ml. | |
|---|---|---|
| | Example 1 | Example 2 |
| 0 | 20 | 20 |
| 10 | | |
| 20 | | |
| 30 | | |
| 60 | | |

It will be apparent from the foregoing that excellent defoamant action is obtained when the defoamant composition of this invention is used in an aqueous, acidic medium. When the nonionic surface active agent and/or the amide are omitted, the defoamant action is poor. Thus, both are necessary for defoamant action.

In commercial practice, regardless of the actual concentration of the ingredients of the defoamant composition concentrate, the defoamant is introduced into the aqueous medium in controlled amounts. In general, the amount of fatty acid amide that should be present in the aqueous medium, such as sewage, will be between about 0.025 and about 1 p. p. m. It will be recognized, of course, that the corresponding amount of surface active agent present will be between 0.01 and 0.05 of the weight of amide. Accordingly, it is contemplated that concentrates of the defoamant composition can be used for greater facility of transportation. Such concentrates can be diluted with a carrier at the place of use.

This application is a continuation-in-part of copending application Serial Number 257,412, filed November 20, 1951, now abandoned.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A composition for suppressing foaming in aqueous media having a pH lower than 7, which comprises between about 2 and about 50 weight percent of a fatty acid amide having the formula

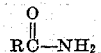

wherein R is an aliphatic group containing between 11 and 19 carbon atoms; between about 0.1 and about 0.5 weight percent of a compound having the formula

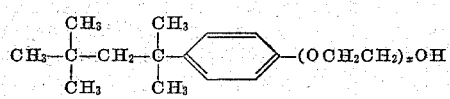

wherein $x$ is an integer varying between 5 and 13; the weight ratio of said compound to said fatty acid amide being between about 0.01 and about 0.05; and the balance a mineral oil having a Saybolt Universal viscosity varying between about 30 and about 200 seconds at 100° F.

2. A composition for suppressing foaming in aqueous media having a pH lower than 7, which comprises between about 2 and about 50 weight percent of a fatty acid amide having the formula

wherein R is an aliphatic group containing between 11 and 19 carbon atoms; between about 0.1 and about 0.5 wheght percent of a compound having the formula

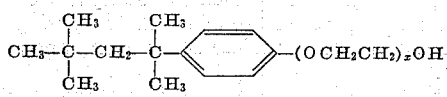

wherein $x$ is an integer varying between 5 and 13; the weight ratio of said compound to said fatty acid amide being between about 0.01 and about 0.05; between about one and about 50 weight percent fatty acid, and the balance a mineral oil having a Saybolt Universal viscosity varying between about 30 and about 200 seconds at 100° F.

3. A composition for suppressing foaming in aqueous media having a pH lower than 7, which comprises about 5 weight percent of a mixture of fatty acid amides having the formula

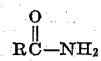

wherein R varies between $C_{16}$ and $C_{18}$; about 0.25 weight percent of a compound having the formula

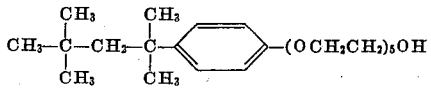

about 5 weight percent oleic acid, and the balance a mineral oil having a Saybolt Universal viscosity of about 100 seconds at 100° F.

4. A composition for suppressing foaming in aqueous media having a pH lower than 7, which comprises above 5 weight percent of a mixture of fatty acid amides having the formula

wherein R varies between $C_{16}$ and $C_{18}$; about 0.25 weight percent of a compound having the formula

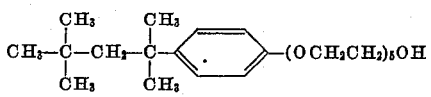

about 5 weight percent oleic acid, and the balance a mineral spirits having a Saybolt Universal viscosity of about 100 seconds at 100° F.

5. A composition for suppressing foaming in aqueous media having a pH lower than 7, which comprises between about 2 and about 50 weight percent of a fatty acid amide having the formula

wherein R is an aliphatic group containing between 11 and 19 carbon atoms; between about 0.1 and about 0.5 weight percent of a nonionic surface active agent; and the balance a liquid carrier in which said fatty amide is soluble but which is substantially immiscible with water; the weight ratio of said surface active agent to said fatty acid amide being between about 0.01 and about 0.05.

References Cited in the file of this patent

UNITED STATES PATENTS

| | | |
|---|---|---|
| 2,052,164 | Buc | Aug. 25, 1936 |
| 2,682,508 | Godfrey | June 29, 1954 |
| 2,751,358 | Caviet | June 19, 1956 |
| 2,753,309 | Figdor | July 3, 1956 |

OTHER REFERENCES

"Ethofats, Ethomids, Ethomeens," a publication of Armour Co. (Chem. Division), 1954, Chicago, pages 16 and 17.